H. E. TOWNSEND.
CLOSURE.
APPLICATION FILED MAR. 2, 1915.
1,159,624.
Patented Nov. 9, 1915.
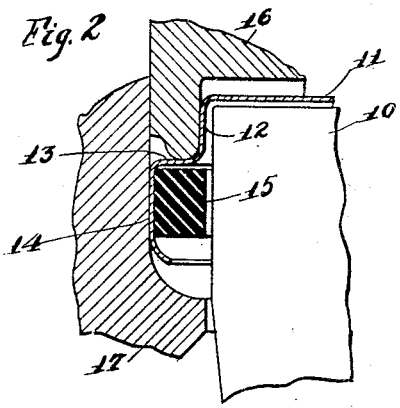
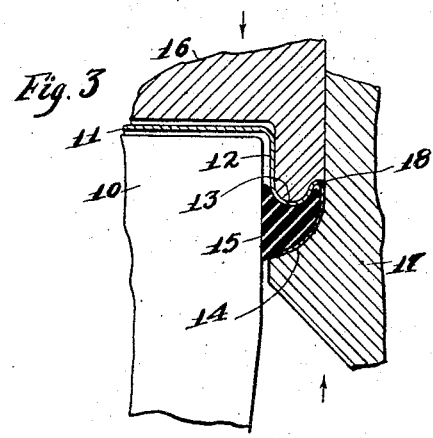
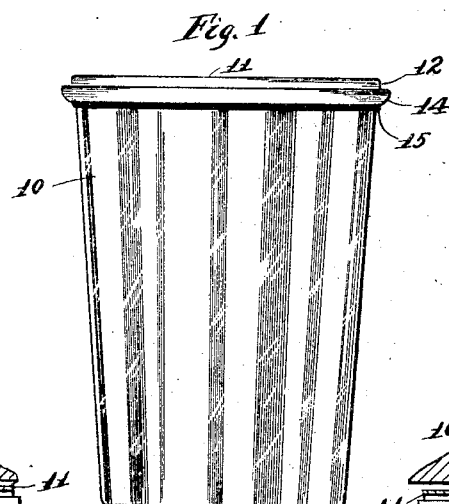
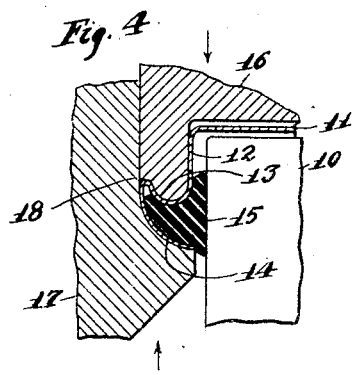
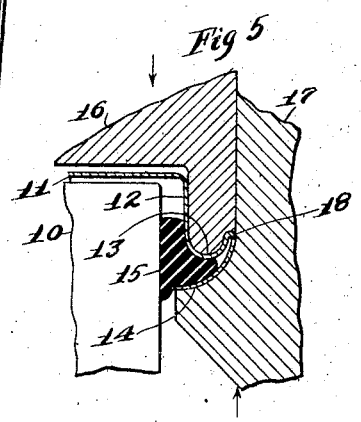
WITNESSES
HARRY E. TOWNSEND INVENTOR
BY
Robert Magrane
ATTORNEY

UNITED STATES PATENT OFFICE.

HARRY E. TOWNSEND, OF BROOKLYN, NEW YORK, ASSIGNOR TO ANCHOR CAP & CLOSURE CORPORATION, OF BROOKLYN, NEW YORK, A CORPORATION OF NEW YORK.

CLOSURE.

1,159,624.   Specification of Letters Patent.   Patented Nov. 9, 1915.

Application filed March 2, 1915. Serial No. 11,595.

*To all whom it may concern:*

Be it known that I, HARRY E. TOWNSEND, a citizen of the United States, residing at Brooklyn, in the county of Kings and State of New York, have invented new and useful Improvements in Closures, of which the following is a specification.

This invention relates to sealing closures adapted to be applied to glass containers and the like and has particular reference to the type of closure in which the seal is effected against the side wall of the container by compression of a gasket so that the gasket is squeezed laterally against the container wall.

The objects of invention are to provide a closure of such a form that the operation of sealing will not injure the lacquer skin upon the closure; that will require a minimum amount of power in the sealing operation; that will reduce the breakage of glass containers; that will provide a more effective and more permanent seal; that will give a greater latitude in the allowable sizes of glass containers that may be used with the closure, and still other objects will appear in the following description and claims.

Referring to the drawings: Figure 1 is an elevation showing the closure applied to a glass container such as a tumbler; Fig. 2 is a sectional elevation of a part of the closure and sealing jaws as they appear before the sealing operation; Fig. 3 is a similar view showing the closure as applied to a container of relatively large size; Fig. 4 is a similar view showing the closure as applied to a container of normal size; and Fig. 5 is a similar view showing the closure as applied to a container of relatively small size.

The glass container is shown at 10. The cap 11 is provided usually with a depending flange 12 which may be made of varying depth as desired, and it also has an annular beading indicated at 13, 14 which incloses a gasket 15 of rubber or other suitable composition.

The sealing jaws are indicated at 16 and 17 and the sealing is effected by a relative movement of the jaws toward each other, whereby the gasket 15 is compressed in a vertical direction and flows laterally under this pressure into a sealing contact with the container wall. A machine equipped with jaws operating in the manner described is disclosed in patent to J. V. Hull, No. 874,201, December 17, 1907.

By the present invention, the beading of the closure is formed with curved surfaces. As shown in Figs. 3, 4 and 5, the upper wall 13 is formed with a concave annular surface, while the outer and lower sections of the beading are in the form of a single convex wall 14. The two parts 13 and 14 of the beading form a cross-sectional area between them in the form of a horn, the cross-sectional area of the horn increasing from its tip 18 radially inward.

By forming the beading with curved surfaces, the metal flows more easily under pressure of the sealing dies, the pressure of the dies is more evenly distributed, and there is less bruising or breaking of the lacquer skin. Less power is also required to operate the dies, and as the sealing pressure usually required with these forms of closures runs into thousands of pounds, a considerable saving of power is made and there is less wear upon the sealing machinery.

With the improved type of closure having the horn-shaped cross-section, a greater amount of the gasket material is utilized in making the seal and a greater area of sealing contact with the container wall is secured, increasing the effectiveness and permanency of the seal. A further advantage of the horn-shaped cross-section is that containers of widely varying sizes may be effectively sealed by the same size of closure.

Closures of the side sealing type are made in set sizes and the greatest allowable variation of the glass container is a maximum or minimum variation of ¾ of a milimeter from the size of the closure. With the improved type of closure owing to the horn-shaped cross-section of the beading, the permissible limits of the containers may be extended 100 per cent., so that breakage on oversize glass is greatly reduced, and effective seals are secured on glass that is undersize.

Fig. 3 shows the form of the horn when the closure is applied to a container of large size, while Fig. 5 shows the form of the horn when the same sized closure is applied to a container of small size.

As shown in Fig. 2, the outer wall of the beading is originally straight, and the amount of curvature given to the wall will vary with the size of the container. In Fig. 3, the upper part of the outer wall is still straight or only slightly curved, while in Fig. 5, the entire outer wall has a curved convex form.

I claim:

1. A closure provided with an annular beading and a gasket held under compression between opposing walls of the beading with a portion of said gasket displaced laterally under said compression against the wall of the container, the said beading having a horn-shaped cross-section increasing in area inwardly.

2. A closure provided with an annular beading and a gasket held under compression between opposing walls of the beading with a portion of said gasket displaced laterally under said compression against the wall of the container, the said beading having its upper wall in the form of a concave surface and the opposing wall in the form of a convex surface, the two walls being so related that the cross-sectional area of the beading increases inwardly.

HARRY E. TOWNSEND.

Witnesses:
DAVID COHN,
I. I. STEWART.